United States Patent [19]

Ohashi

[11] Patent Number: 4,875,105

[45] Date of Patent: Oct. 17, 1989

[54] VIDEO SIGNAL PROCESSING DEVICE

[75] Inventor: Kazuhito Ohashi, Kanagawa, Japan

[73] Assignee: Canon Kabushiki Kaisha, Tokyo, Japan

[21] Appl. No.: 144,591

[22] Filed: Jan. 7, 1988

Related U.S. Application Data

[63] Continuation of Ser. No. 894,127, Aug. 7, 1986, abandoned.

[30] Foreign Application Priority Data

Aug. 7, 1985 [JP] Japan .............................. 60-172440
Aug. 7, 1985 [JP] Japan .............................. 60-172441

[51] Int. Cl.⁴ .................... H04N 9/07; H04N 9/81; H04N 11/10
[52] U.S. Cl. ................................ 358/310; 358/14; 358/41; 358/44
[58] Field of Search .................. 358/12, 14, 41, 43, 358/44, 50, 310

[56] References Cited

U.S. PATENT DOCUMENTS

| | | | |
|---|---|---|---|
| 3,781,463 | 12/1973 | Van den Bussche | 358/14 |
| 4,245,235 | 1/1981 | Poetsch | 358/14 |
| 4,246,598 | 1/1981 | Bock et al. | 358/12 |
| 4,345,269 | 8/1982 | Takemura | 358/44 |
| 4,415,937 | 11/1983 | Nishizawa et al. | 358/213.12 |
| 4,559,554 | 12/1985 | Nitta | 358/44 |
| 4,630,131 | 12/1986 | Ichinoi et al. | 358/310 |
| 4,641,201 | 2/1987 | Ichinoi et al. | 358/12 |

FOREIGN PATENT DOCUMENTS 113584 6/1985 Japan .................................. 358/14

Primary Examiner—John W. Shepperd
Attorney, Agent, or Firm—Toren, McGeady & Associates

[57] ABSTRACT

A video signal processing device comprises a pulse generating circuit arranged to produce reading pulses for a given first period of time within one horizontal scanning period and to be in repose for the remaining second period of time; a signal processing circuit arranged to introduce a video signal read out from an image sensor according to the reading pulses and to form first and second video signals; a memory arranged to store the second video signal; and a change-over circuit for producing the first video signal from the signal processing circuit during the first period and the second video signal from the memory during the second period.

12 Claims, 7 Drawing Sheets

VIDEO SIGNAL PROCESSING DEVICE

This is a continuation of application Ser. No. 894,127, filed Aug. 7, 1986 now abandoned.

BACKGROUND OF THE INVENTION

1. Field of the Invention

This invention relates to a video signal processing device which is arranged to record a video signal by time compressing the video signal.

2. Description of the Related Art

For recording a video signal, a method of carrying out a multiplex recording operation on a luminance signal Y and a chrominance signal C by time compressing them has been known. The operating principle of this time-base multiplexing method is as shown in FIG. 1 of the accompanying drawings. In the case of FIG. 1, a time-base multiplexing operation is performed by time compressing the luminance signal Y and the chrominance signal C of each horizontal scanning period (hereinafter referred to as H period) in the ratio of, for example, M : N. With these signals Y and C recorded through the time-base multiplexing operation carried out in this manner, these signals are readily separable by means of a simple switch. Therefore, this method, as compared with a frequency multiplexing method, lessens the possibility of picture quality deterioration due to imperfect separation of the signals Y and C resulting in the so-called cross-color or cross-luminance.

FIG. 2 is a block diagram showing, by way of example, an arrangement of an electronic still picture camera to which the conventional time-base multiplex recording method is applied. In accordance with this arrangement, an image formed by an imaging lens 101A is converted by a solid-state image sensor 101B into an electrical signal for every picture element. The solid-state image sensor 101B serially produces, for every picture element, image data in synchronism with a clock signal f produced from a clock pulse generator 109. The image signal thus produced from the sensor 101B is amplified by a pre-amplifier 102 and is then supplied to a video signal processing circuit 103. At the circuit 103, a luminance signal Y and a chrominance signal C are produced mainly by a matrix computing operation. These signals Y and C are respectively supplied via switches S1 and S2 to a first or second memory 104 or 105 and a third or fourth memory 106 or 107 to be temporarily stored at these memories. Upon completion of the storing process, the connecting position of each of the switches S1 and S2 is shifted to a position for the other memory. Meanwhile, switches S3 and S4, which are disposed on the output side of these memories, are in connecting positions for the other memories. The switch arrangement is such that, while the signal Y is written into either the first memory 104 or the second memory 105 via the switch S1 for every H period portion, the other memory which is not undergoing the writing process produces via the switch S3 the signal Y of one H period immediately preceding the present H period. The third and fourth memories 106 and 107 also operate in the same manner.

The above-stated memory arrangement has been made for the purpose of time-base compressing one-H-period portions of the signals Y and C in a desired ratio between them. This arrangement is generally known as the double buffer method. More specifically, the one-H-period portion of the signal Y which is stored either at the first memory 104 or the second memory 105 and that of the signal C which is stored at the third memory 106 or the fourth memory 107 are produced during the next H period according to a clock frequency of $\{(M+N) / M\}$ $f_Y$ {MHz} and a clock frequency of $\{(M+N) / N\}$ $f_C$ {MHz} respectively. However, a point of time at which the signal C begins to be read out must be arranged to coincide with a point of time at which the signal Y ceases to be read out. In the formulas shown above:

M : N: Ratio in which the signals Y and C of FIG. 1 are time-base multiplexed $f_Y$: Clock frequency to be used in storing the signal Y in the memory $f_C$: Clock frequency to be used in storing the signal C in the memory The signals Y and C are thus compressed by M / (M+N), and by N / (M+N) respectively.

Further, a switch S5 is arranged to have the signals Y and C time-base multiplexed in the manner as shown in FIG. 1. The connecting position of the switch S5 is at one terminal "a" thereof during a period from the start of reading the signal Y (or the end of reading the signal C) to the end of reading the signal Y (or the start of reading the signal C). During other periods, the connecting position of the switch S5 remains at the other terminal "b" thereof.

FIG. 3 is a timing chart showing the above-state operation. In FIG. 3, reference symbols Y' and C' respectively denote time compressed signals Y and C. A part (D) of FIG. 3 shows a multiplex signal obtained through the switching operation of the switch S5 which is as shown at a part (C) of FIG. 3.

Again referring to FIG. 2, an adder 110 is arranged to receive a horizontal synchronizing signal $f_H$ produced from the clock pulse generator 109 and the video signal which is time-base multiplexed and is coming via the switch S5. A signal produced from this adder 110 is frequency modulated by a frequency modulator 108 to be at an optimum recording level. Then, the adjusted signal is recorded through a head part 120 onto a recording medium which is not shown.

With the conventional electronic still picture camera arranged to perform recording as described in outline above, a reproduced picture can be obtained by carrying out a signal processing operation in a manner reverse to the operation described in the foregoing. As apparent from the foregoing, in recording or reproducing a video signal by a time-base multiplexing process, a memory arrangement is required for temporarily storing the signals Y and C. However, this requirement presents a problem which is serious especially in the case of such an apparatus as the electronic still picture camera that must be arranged in a compact size.

SUMMARY OF THE INVENTION

It is an object of this invention to provide a video signal processing device which is capable of solving the above-stated problem of the prior art and, particularly, is capable of permitting reduction in required capacity of the memory arrangement for reduction in size and cost of the device.

To attain this object, a video signal processing device arranged as an embodiment of this invention comprises: pulse generating means arranged to produce reading pulses for a given first period of time within one horizontal scanning period and to be in repose for a remaining second period of time; signal processing means arranged to introduce a video signal read out from an image sensor according to the reading pulses and to form first and second video signals; memory means arranged to store the second video signal; and change-over means for producing the first video signal from the signal processing means during the first period and the second video signal from the memory means during the second period.

With the embodiment arranged in this manner, a high speed clock signal which has pause periods is used in reading image data from the image sensor for accomplishing a time-base compressing operation on the video signal. In this case, the first video signal is produced directly while the second video signal is produced via the memory means.

Another embodiment of this invention comprises: pulse generating means arranged to produce a first clock signal having a first frequency during a given first period of time within each horizontal scanning period and to produce a second clock signal having a second frequency during the remaining second period of time within the same horizontal scanning period; and signal processing means. The signal processing means is arranged such that: one-horizontal-scanning-period portions of first and second video signals are read out by applying to a nondestructively readable image sensor the first and second clock signals one after another. Then, a video signal for each horizontal scanning period (H period) is formed on the basis of the first and second video signals thus read out.

In this instance, reading clock signals of two different frequencies are applied to a solid-state image sensor which permits nondestructive reading therefrom. This arrangement obviates the necessity of using a memory arrangement for time-base compressing the video signal.

Other objects and features of this invention will become apparent from the following description taken in connection with the accompanying drawings.

BRIEF DESCRIPTION OF THE DRAWINGS

FIG. 7 is a timing chart showing the operation of the second embodiment.

DETAILED DESCRIPTION OF THE PREFERRED EMBODIMENTS

Figure 4:
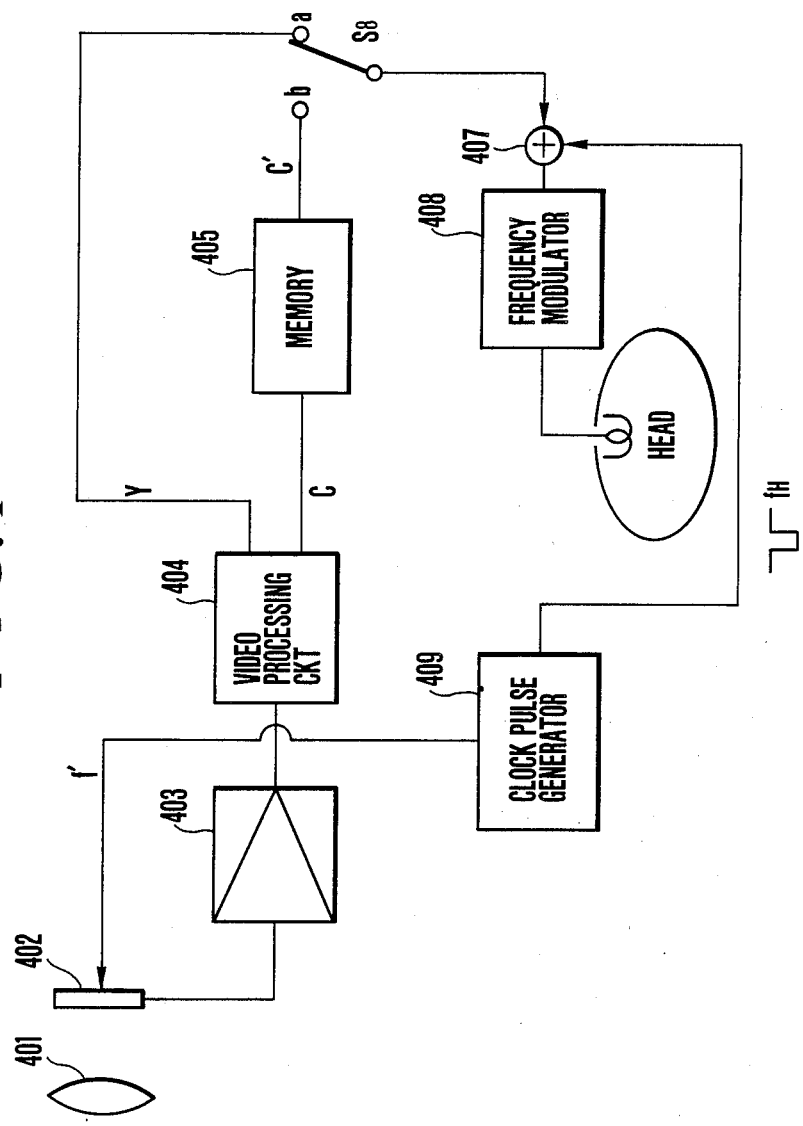
FIG. 4 is a block diagram showing a first embodiment of this invention.

FIG. 4 shows, in a block diagram, a video signal recording apparatus to which this invention is applied as a first embodiment. In FIG. 4, reference numeral 401 denotes an image forming lens. A solid-state image sensor 402 is arranged to convert an image formed thereon into an electrical signal for every picture element. Picture element signals thus obtained are produced and supplied to a pre-amplifier 403 in synchronism with a clock signal f' which is produced from a clock pulse generator 409.

Figure 1:
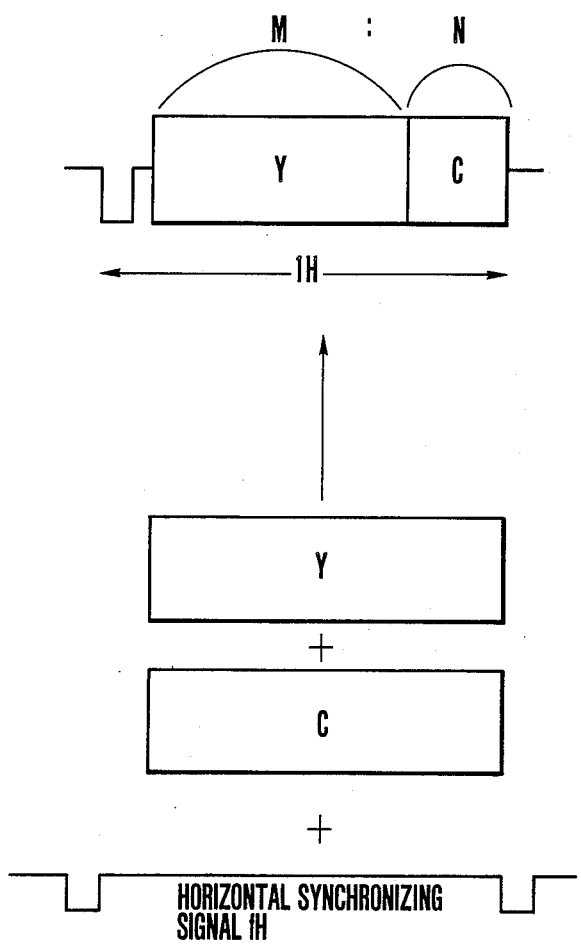
FIG. 1 is an illustration of the principle of a time-base compressing multiplex recording operation on a video signal.
Figure 2:
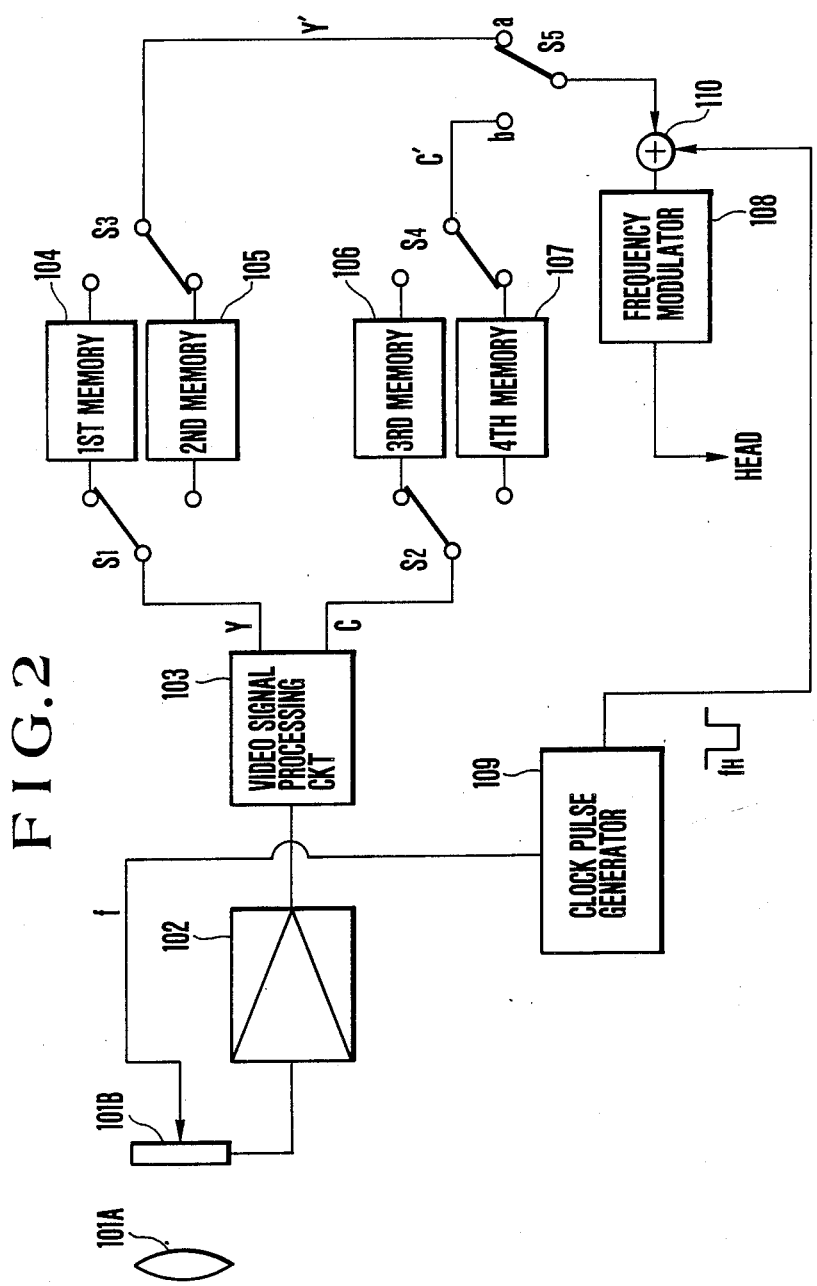
FIG. 2 is a block diagram showing an electronic still picture camera arranged according to the conventional time-base compressing multiplex recording method.
Figure 3:
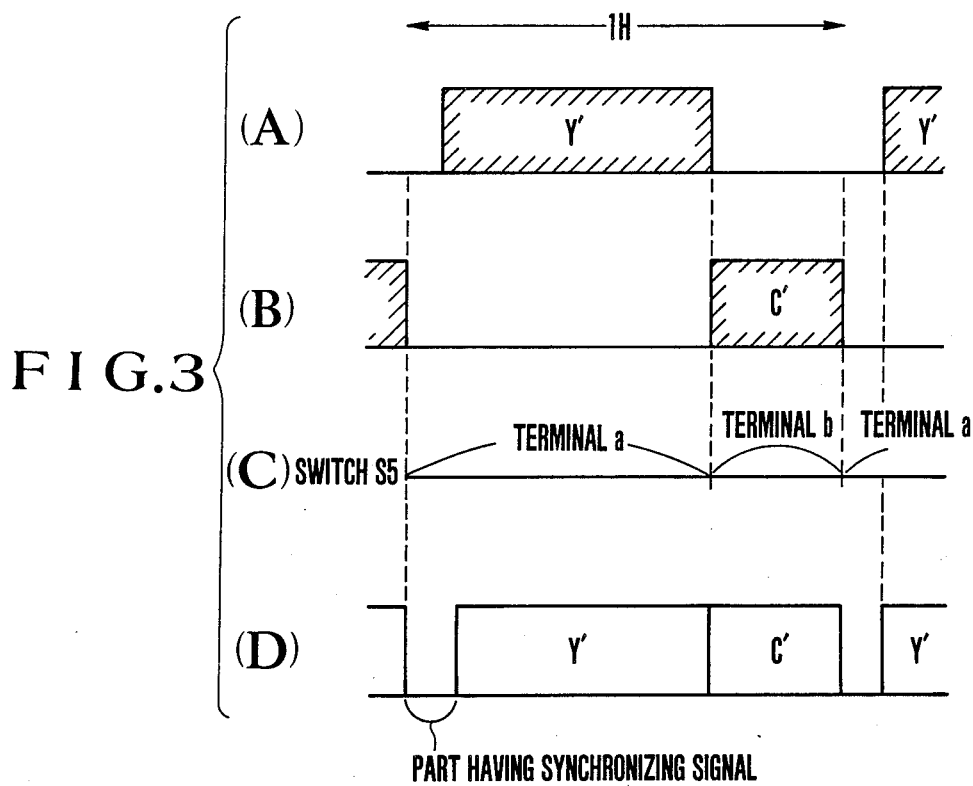
FIG. 3 is a timing chart showing a time-base multiplexing operation.

A video signal processing circuit 404 is arranged to perform a matrix computing operation on the picture element signals produced from the pre-amplifier 403 and to form thereby a luminance signal (hereinafter referred to as Y signal) as a first video signal and a chrominance signal (hereinafter referred to as C signal) as a second video signal. Up to this part of the device, the signals are processed in the same manner as in the conventional arrangement shown in FIG. 2. In the case of this embodiment, however, the frequency of the reading clock signal used for reading from the solid-state image sensor 402 is changed to a frequency f' from the conventional frequency f. The frequency f' is in the following relation to the frequency f:

$$f' = f \times \left( \frac{M+N}{M} \right) \quad (1)$$

wherein M : N represents a time compressing ratio between the Y signal and the C signal as shown in FIG. 1.

Further, the clock signal f' employed in this specific embodiment of this invention is not in the form of a continuous signal but is a clock signal having a pause period of $$\left( \frac{N}{M+N} \times 1 \right)$$

Figure 5:
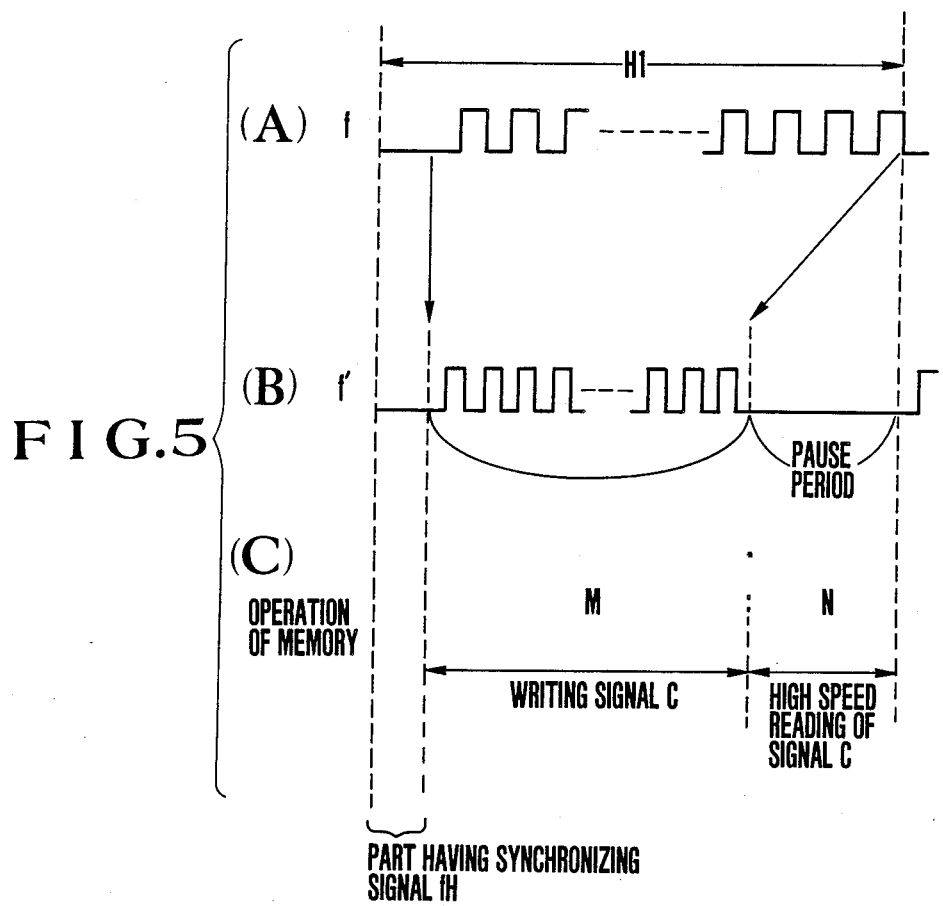
FIG. 5 is a timing chart showing the operation of the first embodiment.

H at the end of every H period as shown at a part (B) in FIG. 5. Accordingly, the frequency of the clock signal f' of this embodiment is arranged to be $$\left( \frac{N+N}{M} \right)$$

times as much as that of the conventional clock signal f. However, since there is the pause period of $$\left( \frac{N}{M+N} \right) H,$$

the total number of pulses for every H period of the clock signal f' is equal to that of the conventional clock signal f.

As a result of this arrangement, the Y and C signals, which are formed by and produced from the video signal processing circuit 404, are both compressed by $$\left( \frac{M}{M+N} \right)$$

for every H period at that point of time.

Next, one H period portion of the C signal produced from the video signal processing circuit 404 is stored at a memory 405, which may be replaced with a CCD. The operation timing of the memory 405 is as shown at a part (C) in FIG. 5. The C signal is written into the memory 405 during the non-pause period of the clock signal f'. The C signal is then read out at a high speed during the pause period, so that the C signal can be time compressed by (N / M).

Again referring to FIG. 4, a switch S8 is arranged to be operated for time-base multiplexing the Y and C signals. An adder 407 is arranged for superimposing a horizontal synchronizing signal $f_H$ on the video signal which has been time-base multiplexed. A reference numeral 408 denotes a frequency modulator. These parts are arranged to operate in the same manner as in the case of FIG. 2.

In the embodiment described, as mentioned above, the video signal is time-base compressed by using the high speed clock signal in reading the image data from the image sensor. This arrangement obviates the necessity of using a memory for time-base conversion of the Y signal which has a wide frequency band. The embodiment, therefore, permits great reduction in the capacity of memories or CCD's or the like otherwise required for time compression. The reduction in the capacity of the memory arrangement of the recording system is highly advantageous for improvement in the picture quality and reduction in size of the electronic still picture camera.

Figure 6:
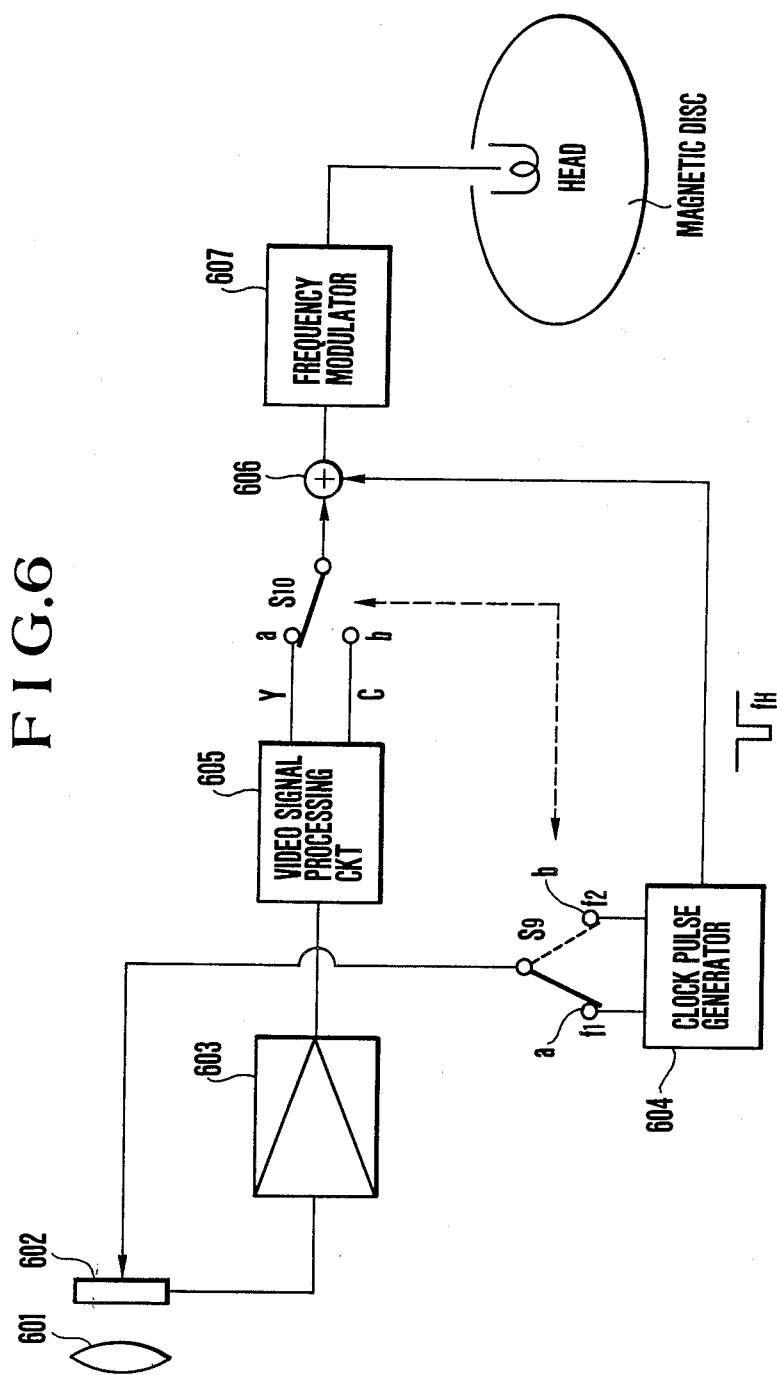
FIG. 6 is a block diagram showing a second embodiment of the invention.

FIG. 6 is a block diagram showing a video signal recording apparatus embodying this invention as a second embodiment. A feature of this embodiment resides in the use of a solid-state image sensor which permits nondestructive reading. The nondestructively readable solid-state image sensor may be selected from a group of elements including, for example, SIT (static introduction transistors) disclosed in U.S. Pat. No. 4,415,937; and BASIS (base stored image sensors) disclosed in Japanese Laid-Open Patent Application No. Sho 60-12759.

In FIG. 6, the illustration includes an image forming lens 601; the nondestructively readable solid-state image sensor 602; a pre-amplifier 603; a clock pulse generator 604; and a video signal processing circuit 605 which is arranged to form a luminance signal (Y signal) and a chrominance signal (C signal).

The clock pulse generator 604 produces clock pulse signals of two different frequencies f1 and f2 which can be expressed below:

$$f1 = f \times (M+N) / M \text{ [MHz]} \quad (1)$$

$$f2 = f \times (M+N) / N \text{ [MHz]} \quad (2)$$

Referring to FIG. 7, a reading clock signal is obtained as shown at a part (B) of FIG. 7 via a switch S9 which turns on and off at a timing as shown at a part (C) of FIG. 7. With this reading clock signal applied via this switch S9 to the nondestructively readable solid-state image sensor 602, a video signal is read out twice in each H period in accordance with the clock pulses of the different frequencies f1 and f2 included in the reading signal as shown at a part (A) in FIG. 7. Further, the symbols f, M and N included in Formulas (1) and (2) above represent the same frequency and the compression ratio as those shown in FIG. 2. A signal processing circuit 005 is arranged to introduce the video signal and to produce Y and C signals by performing a computing operation every time the signal is introduced.

With the embodiment arranged in this manner, the Y and C signals can be time compressed in the compressing ratio M : N by utilizing the storage function of the solid-state image sensor. A switch S10 is arranged to operate at the same timing as the switch S9 and to perform a time-base multiplexing operation on the Y and C signals which are time-base compressed in the ratio of M : N.

An adder 606 is arranged to time-base superimpose a horizontal synchronizing signal produced from the clock pulse generator 604 on the video signal. This adder 606 and a frequency modulator 607 are arranged to operate in the same manner as the conventional arrangement shown in FIG. 2.

The second embodiment is arranged, as described above, to use two different clock signals in reading image data from the nondestructively readable solid-state image sensor. This arrangement is highly advantageous as it obviates the use of any memory for time-base conversion. The embodiment permits improvement in picture quality and reduction in the size of the still picture camera as it dispenses with memory arrangement for the recording system of the camera.

What is claimed is:

1. A video signal processing device, comprising:
   image sensing means for permitting non-destructive read-out;
   clock pulse generating means for generating clock pulses in one horizontal scanning period, said clock pulse generating means being arranged so as to generate first clock pulses having a first frequency during a first period shorter than said horizontal scanning period, and so as to generate second clock pulses having a second frequency higher than said first frequency during a second period other than said first period in said one horizontal scanning period; and
   signal processing means for forming a first video signal by using a signal put out from said image sensing means by driving said image sensing means with said first clock pulses generated by said clock pulse generating means, and a second video signal by using a signal put out from said image sensing means by driving said image sensing means with said second clock pulses generated by said clock pulse generating means, sand to put said first and second video signals in the horizontal scanning period in a time-division multiplexing manner.

2. A device according to claim 1, wherein said first and second video signals are read out from a single horizontal line portion of said image sensing means.

3. A device according to claim 2, wherein a first clock signal produced during said first period of time has a number of clock pulses equal to the number of clock pulses of a second clock signal produced during said second period of time.

4. A device according to claim 3, wherein said first video signal is a luminance signal and said second video signal is a chrominance signal.

5. A device according to claim 1, and further comprising modulating means for modulating said first and said second video signals produced from said signal processing means.

6. A device according to claim 5, wherein said modulating means includes a frequency modulator.

7. A device according to claim 1, and further comprising adding means for adding a horizontal synchronizing signal to said first and said second video signals produced from said signal processing means.

8. A recording device comprising:
   image sensing means having a plurality of horizontal line portions and permitting a non-destructive read-out;

image signal forming means for forming a first image signal by using a signal obtained by effecting read-out of one horizontal line portion of said image sensing means at a first speed during one horizontal scanning period, and forming a second image signal, different in kind from said first image signal, by using a signal obtained by effecting read-out of one horizontal line portion of said image sensing means at a second speed higher than said first speed during said one horizontal scanning period; and recording means for recording said first and said second image signals formed by said image signal forming means on a recording medium.

9. A recording device according to claim 8, wherein said image signal forming means includes clock pulse generating means for generating clock pulses in one horizontal scanning period, said clock pulses generating means being arranged so as to generate first clock pulses having a first frequency during a first period shorter than said one horizontal scanning period, and to generate second clock pulses having a second frequency higher than said first frequency during a second period other than said first period in said one horizontal scanning period, said image signal forming means further including signal processing means arranged so as to form the first image signal by using a signal produced from said image sensing means by driving said image sensing means with said first clock pulses generated by said clock pulse generating means, and to form the second image signal by using a signal put out from said image sensing means by driving said image sensing means with said second clock pulses generated by said clock pulse generating means.

10. A recording device according to claim 8, wherein said recording means includes:

change-over means for selectively receiving one of said first image signal and said second image signal put out from said image signal forming means;

synchronizing signal adding means for adding a synchronizing signal to the image signal received from said change-over means; and modulating means for modulating the image signal added with the synchronizing signal by said synchronizing signal adding means and for putting out the image signal thus modulated.

11. A recording device according to claim 10, wherein said modulating means includes a frequency modulator.

12. A recording device according to claim 8, wherein said first image signal includes a luminance signal and said second image signal includes a chrominance signal.

* * * * *